Dec. 12, 1933.    W. C. WEBER    1,939,636
SEWAGE GRIT REMOVAL
Original Filed Dec. 14, 1928    4 Sheets-Sheet 3
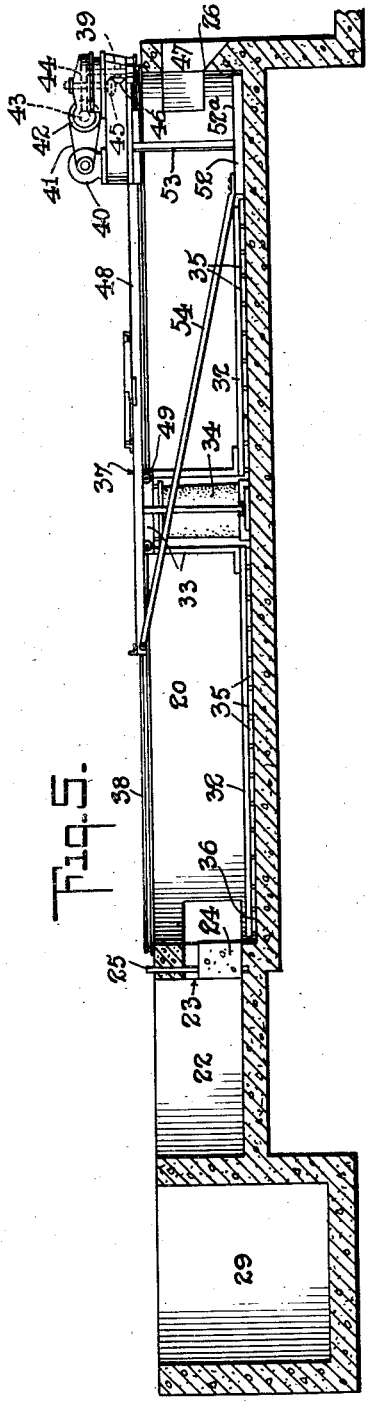
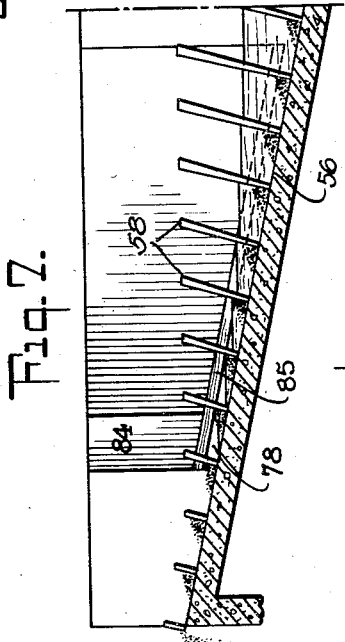
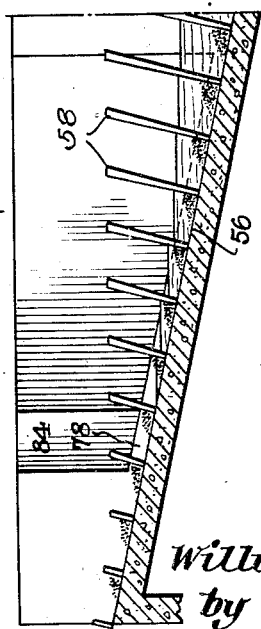
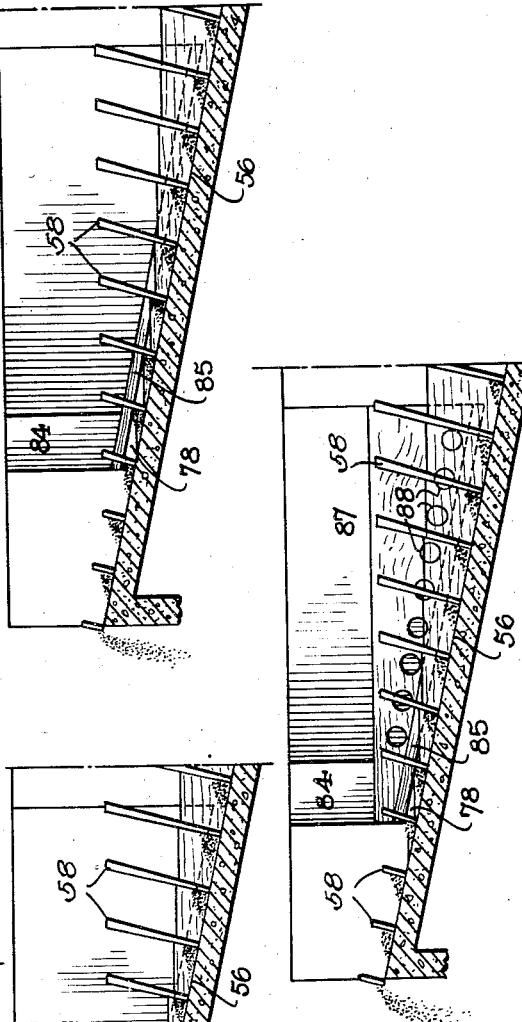
Inventor:
William C. Weber;
by Arthur Middleton
Attorney.

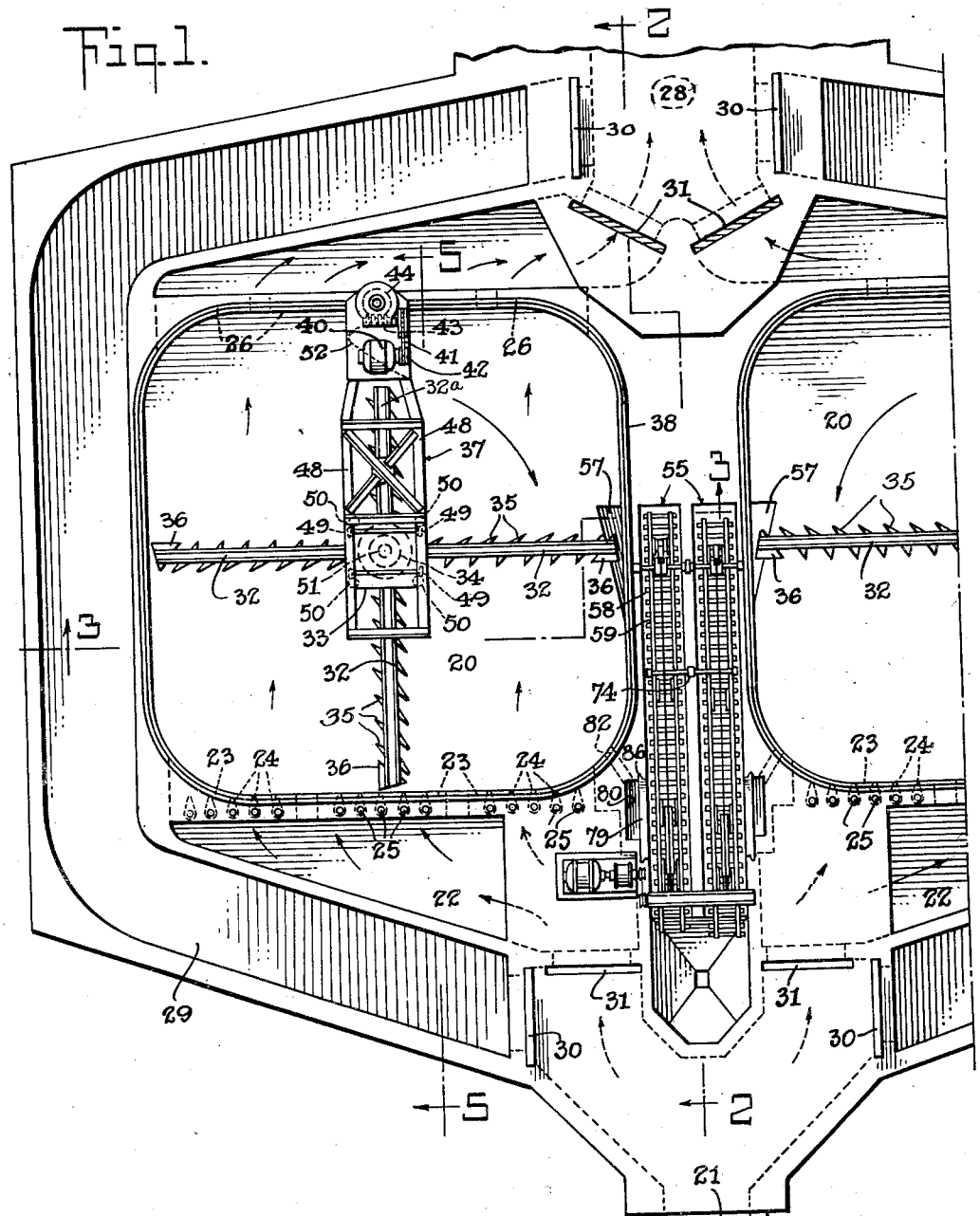

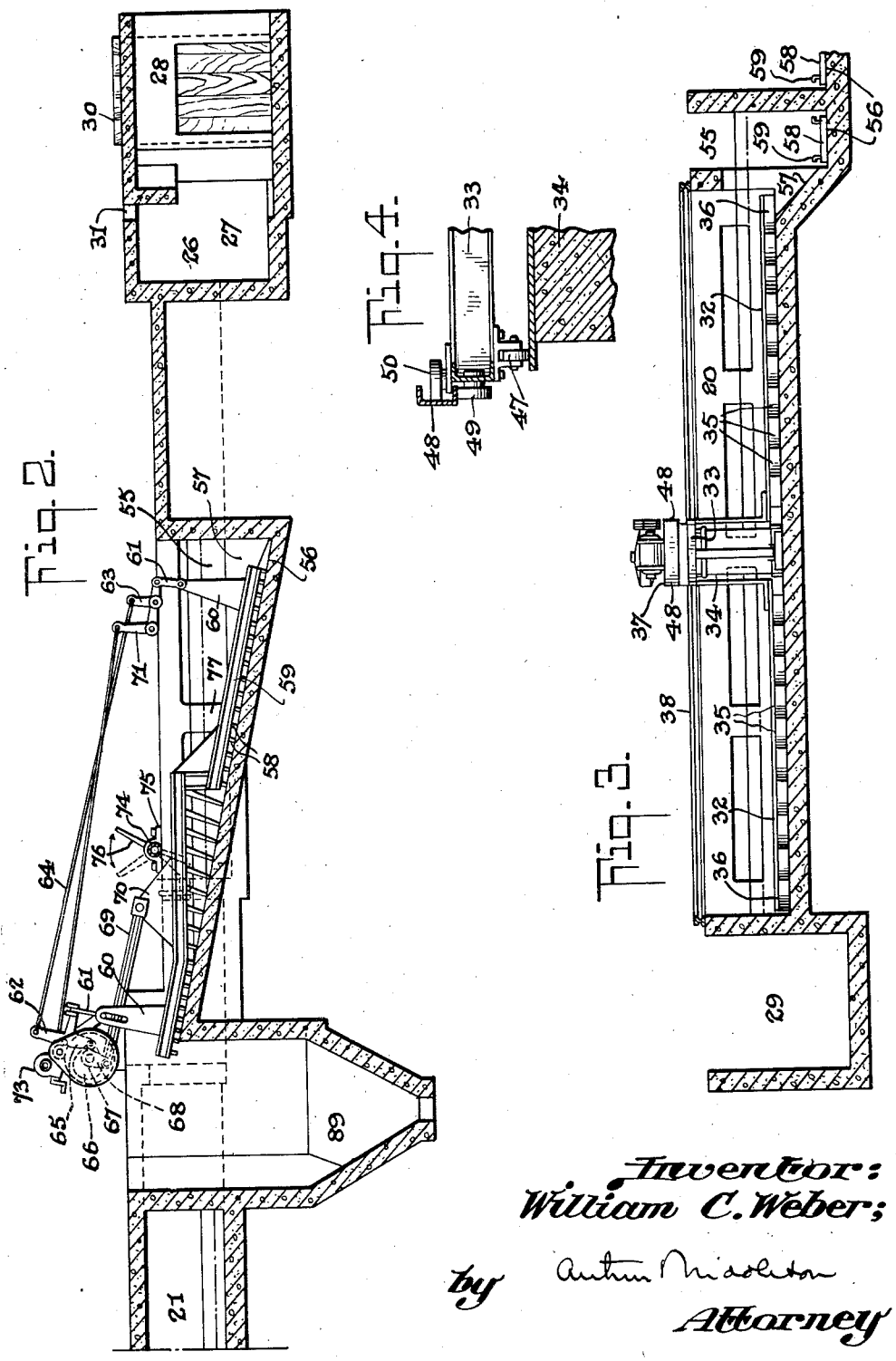

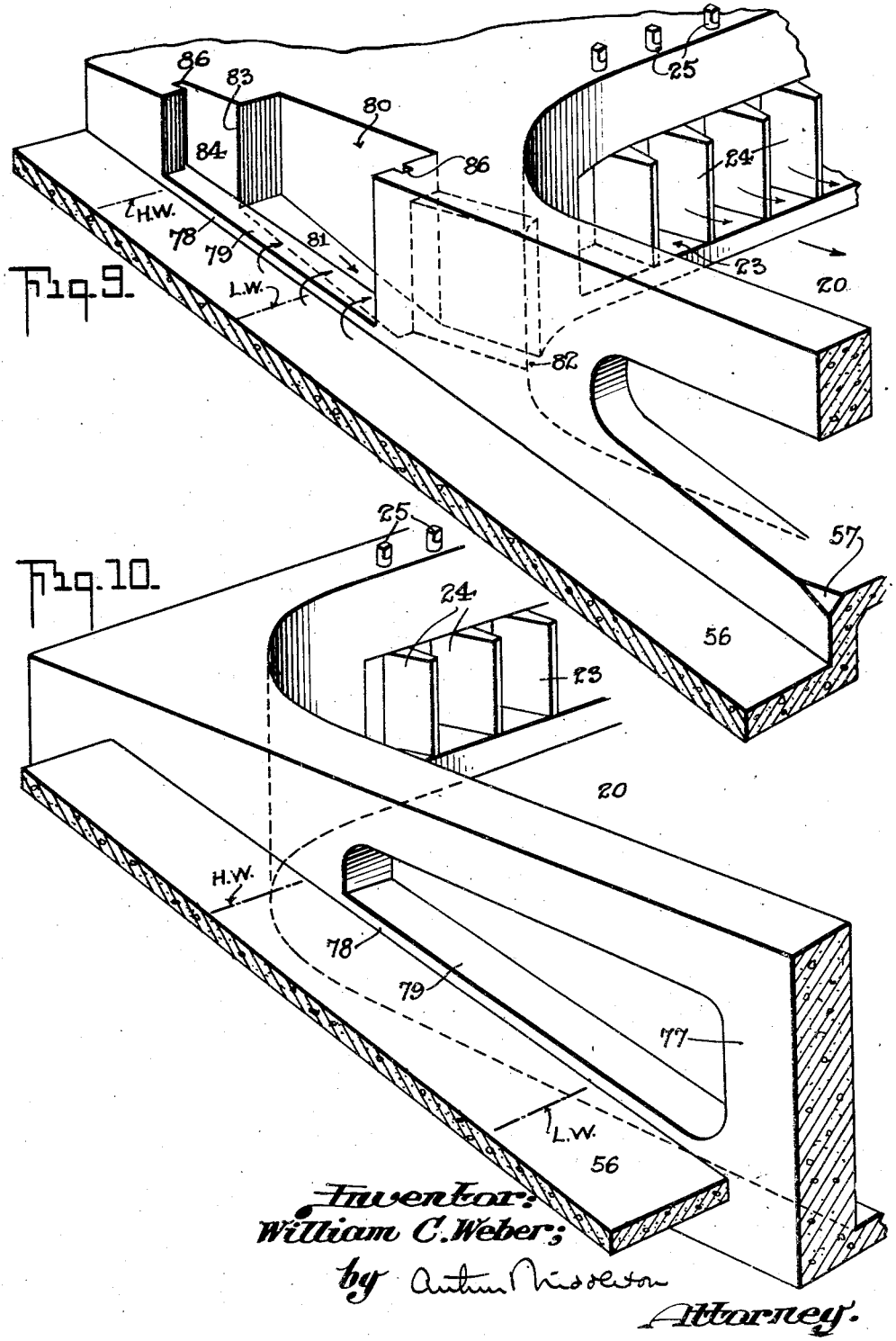

Patented Dec. 12, 1933

1,939,636

UNITED STATES PATENT OFFICE 1,939,636

SEWAGE GRIT REMOVAL

William C. Weber, Larchmont, N. Y., assignor, by mesne assignments, to The Dorr Company, Inc., New York, N. Y., a corporation of Delaware Original application December 14, 1928, Serial No. 328,155. Divided and this application September 8, 1932. Serial No. 632,202

6 Claims. (Cl. 210—3)

This invention relates to improvements in apparatus for removing solid particles from liquid suspension by sedimentation and mechanical removal of the settled solids, and particularly to apparatus of this type adapted to remove only the solids having a settling rate above a predetermined minimum.

The apparatus is adapted for continuous operation and comprises in general the combination of a primary settling chamber having a mechanism for discharging settled solids, with a secondary treating station or zone receiving the settled solids and having mechanism for selectively removing such solids from the liquid. While the apparatus may be operated in different ways to suit various conditions and materials, it is especially adapted to the efficient removal from flowing liquids of a portion of the solids suspended therein, the settling chamber operating as a hydroseparator in which the more slowly settling solids, referred to as the undersize, pass out with the overflow, while the settled solids which in hydroseparators always include a substantial amount of undersize are discharged into the selective classification station or compartment where the undersize is removed or rejected by the classification station and returned to the settling chamber. This arrangement produces efficient classification of the solids since hydroseparation produces an overflow free from oversize but with considerable undersize in the settled solids, while classification apparatus suitable for the secondary compartment will produce a solids discharge free from undersize but tends to include some oversize in the overflow which returns to the settling chamber.

It has been proposed heretofore to combine a settling tank with a classification device; but such combinations have been so designed and arranged that the settling and classifying elements thereof are intimately related both mechanically and functionally, with the result that neither element can be materially changed in design or operation without substantially affecting the other. Furthermore, such arrangements are not adapted to certain operating conditions, such for instance as the treatment of large flows of liquid to remove a proportionately small amount of oversize, which requires a large settling chamber designed on the basis of the rate of flow, with a relatively small classification compartment designed for efficient handling of the small amount of oversize, and operating with the settling chamber as a single classification apparatus.

An important object of this invention is therefore the combination of a settling chamber and a classification compartment so that it may form a unitary apparatus in which the settling chamber can be designed and operated in conformity with established principles of sedimentation and hydroseparation, and of any suitable material including concrete, while the classification compartment can likewise be designed and operated according to the established technology of classification without limitation by the settling chamber construction and operation.

A further object is to provide an efficient continuous mechanically cleaned sewage grit chamber, for which purpose the embodiment of the invention hereinafter described in detail is intended. According to present practice sewage is passed through long parallel channels in which the granular material or grit settles out. These channels are cut out in turn when a sufficient amount of grit is collected, and the grit is removed by grab buckets or the like. As a substantial amount of non-granular or organic matter is necessarily included with the grit thus removed, it is necessary to subject the grit to a washing operation to remove such organic matter which would otherwise render the grit highly offensive.

Although various forms of wet classification apparatus have been well known for a long time, it has been found impractical heretofore to separate the grit from sewage by standard wet classification methods or apparatus which have been successful in other fields of use, owing to the relatively small amount of grit in ordinary sewage, the great fluctuations in the sewage level between dry weather flow and storm flow, and particularly to the difficulty of separating from the grit certain types of solids, including some of an adhesive nature, together with rags, paper and the like which cannot be removed efficiently by standard classification methods and which tend to render such types of classification mechanisms unsightly and offensive after a short period of use. For convenience all solids in the sewage except grit will be referred to herein as organic matter.

According to the present invention the grit is initially removed from the sewage by sedimentation in a large comparatively shallow chamber or tank, the settled grit and entrained organic matter being conveyed by mechanical scrapers to the secondary zone of treatment such as a bay or other compartment which preferably is located marginally of the primary chamber and in direct connection therewith. In this compartment is located a classification apparatus which not only removes the grit mechanically but which is adapted to exert a liquid agitative influence in order to agitate the grit sufficiently to throw the entrained organic solids into suspension whereby they are rejected from discharge by the classifier apparatus and returned to the main settling chamber, from which they are discharged with the overflow, leaving a clean grit for ejection or discharge from the secondary compartment.

It has been found advantageous to employ in the secondary compartment a reciprocating rake mechanism of the type used in standard wet classification apparatus, as the reciprocating action is highly effective in producing the exact amount of agitation desired, and the design and operation of this type of classifying apparatus has been thoroughly worked out and is widely understood.

Classification apparatus of the desired type requires a sloping bottom or inclined deck in the secondary compartment, the grit being discharged over the upper end of such bottom substantially above the water level. It has been found that it is impossible with present known apparatus of this type to remove organic matter which is still included with the grit as the matter reaches the surface of the liquid, since there is not sufficient depth of liquid to carry off the organic matter at this point. An important object of this invention is to provide an arrangement whereby any undersize or more slowly settling solids such as organic matter reaching this point may be removed from the grit by a novel overflow or backflow arrangement.

The slope of the bottom or deck of the classification compartment is determined within narrow limits by the characteristics of the grit; and as the deep end of this compartment is located in the most convenient position to receive the settled solids from the primary chamber, the upper or solids discharge end of the compartment may be located at some distance from the settling chamber. A further object of the invention is the provision of a convenient arrangement whereby the backflow or overflow from such compartment adjacent the liquid level at the grit discharge end may be returned by gravity to the settling chamber regardless of fluctuations in liquid level. Another object is the provision of a lateral overflow arrangement at this point which will minimize the return of grit to the settling chamber with such overflow.

Other objects and advantages of the invention will be apparent from the following description taken in connection with the accompanying drawings, in which:

Fig. 1 is a plan view of one type of apparatus in a duplex arrangement;

Fig. 2 is a vertical section on line 2—2 of Figure 1;

Fig. 3 is a vertical section on line 3—3 of Figure 1;

Fig. 4 is an enlarged fragmentary view showing the supporting and guiding arrangement of the scraping apparatus for the primary settling chambers;

Fig. 5 is a section on line 5—5 of Figure 1;

Figs. 6, 7 and 8 are diagrammatic views taken generally in vertical section longitudinally of the raking apparatus in the secondary compartment and illustrating the discharge of lighter solids carried up by said mechanism;

Fig. 9 is a perspective view of the passage for the discharge of such lighter solids at a point beyond the primary settling chamber, and Fig. 10 is a similar view showing discharge directly into the primary settling chamber.

The primary settling chamber 20 may be of any desired shape, grit chambers now in general use being elongated in form; and is provided with suitable mechanism for scraping settled solids to a discharge zone, where they are transferred to the secondary compartment, while the scraping apparatus may operate periodically, it is generally advantageous to employ continuously operating mechanism owing to the substantial reduction in chamber size which is permitted thereby. Various types of known scraping or rake mechanisms suitable for intermittent or continuous operation may be used, depending partly on the shape of the chamber. Where possible it is desirable to employ a mechanism of the rotating type and to have such mechanism arranged to impel the settled solids outwardly for discharge in a suitable zone at the periphery or margin of the tank, as this permits very convenient location of the secondary or solids washing compartment, within the same tank, if desired. In the preferred form illustrated a rectangular chamber is disclosed, since such chambers provide the greatest economy of space, being particularly desirable where concrete construction is employed, and, by permitting even uniform flow directly across the chamber, resulting in a maximum decrease in velocity, uniform velocity at all points in the chamber, and a consequent efficiency in settling out the solids in a minimum of ground space.

The form shown is designed for use as a sewage grit chamber and lies in the path of a flowing stream of sewage. The sewage enters through the sewer 21 and passes through the influent channel 22 into the settling chamber 20 through inlet openings 23 extending substantially throughout the length of one side of the settling chamber 20, and arranged to give a substantially even flow into the chamber at all points. This is conveniently accomplished by suitably tapering channel 22, and by providing distributing vanes 24 adapted to deflect an appropriate part of the influent sewage from channel 22 into the chamber 20. These vanes 24 may comprise vertical blades of concrete suitably streamlined in horizontal section and mounted in openings 23 by vertical spindles 25 accessible for setting the vanes at the desired angles to regulate the proportion of flow into the tank at any given point.

The liquid flows uniformly across the entire chamber at a greatly reduced velocity, the size of the chamber being designed to permit a predetermined period of detention for the pool of liquid, this period being sufficient for all solid particles having a settling rate above a given predetermined rate to settle to the bottom of the chamber or pool. The remaining solids, if any, together with the liquid overflow a weir 26 (Fig. 5) into the effluent channel 27, connecting with the outlet sewer 28. A suitable bypass 29 may be provided extending around the chamber 20 between the sewer 21 and the outlet sewer 28, from which it is normally shut off by gates 30. When it is desired to shut down the apparatus said gates can be opened, and suitable gates placed in the guide ways 31 to close the openings connecting the influent and effluent channels to the sewers.

The form of raking mechanism for carrying settled solids to a discharge zone at one side of the settling chamber 20 comprises travelling scraping means such as rake arms 32 mounted on a rotary framework 33 (Figs. 3 and 5) pivotally supported on a pillar 34 in the center of the chamber 20 at a point above the high water level. The vertical scraping blades or rakes 35 extend downwardly from the arms 32 and are set at such an angle that by rotation of the framework and arms the rakes 35 engage settled solids and impel them toward the periphery of the chamber 20. At the outer end of each arm 32 suitable means such as scoop 36 is provided for collecting settled solids raked into its zone of travel and carrying same to a suitable discharge opening or chute. In the form shown the scoop is formed of a vertical curved strip of metal mounted below an arm 32 with its wall nearest the center substantially parallel to the rakes and its outer wall having a slight inward inclination from its leading edge to the point of connection with the central wall, preventing the wedging of grit between the outer wall of the scoop and the wall of settling chamber 20. It will be apparent that the arms 32 will serve to collect all solid matter settling in a circular zone extending from the pillar 34 to the path of scoops 36, depositing such material in the path of the scoops.

For collecting solid material settling outside the zone of action of arms 32 particularly in the corners of chamber 20, and for rotating the framework 33 and the rake arms 32, a sliding frame 37 is mounted on framework 33 and track 38 extending around the periphery of chamber 20. The outer end of the sliding frame 37 carries a wheel 39 (Fig. 5) resting on track 38 to support one end of the frame, with suitable drive means for rotating the wheel. The drive may include a motor 40 mounted on frame 37 and driving through belt 41 the pulley 42 on the shaft of worm 43 which rotates worm wheel 44 whose shaft carries bevel gear 45 meshing with bevel gear 46 on the shaft of the wheel 39. Guide rollers 47 at opposite sides of the track 38 keep wheel 39 in position on the track.

The central end of sliding frame 37 is supported on the rotary framework 33 so as to impart rotary motion thereto and permit the necessary longitudinal movement of frame 37 as the wheel 39 approaches and recedes from the corners of the chamber 20. One arrangement is shown in Fig. 4, in which the rotary framework 33, supported on pillar 34 by suitable rollers 47, carries the longitudinal channels 48 of frame 37 on rollers 49, and carries rollers 50 on vertical axes engaging the inner faces of channels 48 to prevent lateral displacement and to impart the necessary rotary movement to the framework 33. A central pivot pin 51 projecting from the top of pillar 34 and socketed in framework 33 prevents lateral displacement of the framework on the pillar.

A suitable collecting device is mounted on the frame 37 for scraping the corners of chamber 20, and may comprise a scoop 52 of the same general type and construction as scoops 36 having a sufficient spread to cover the distance between the extreme corner of the chamber 20 and the adjacent path of scoops 36. (Arm 32a extending toward scoop 52 should be suitably shortened to avoid interference, and carries no scoop 36.) Scoop 52 may be mounted on frame 37 by hangers 53 and 54 connecting the top plate 52a extending across the entire top of the scoop, to the side channel 48 of the frame 37 adjacent the outer and center ends thereof respectively. It has been found that hangers 53 and 54 are efficacious in breaking up any ice which forms in the settling chamber.

The secondary compartment or bay may be located in any position where it can readily receive the settled solids discharged marginally from the settling chamber 20 and return to said chamber any excess of liquid, together with any more slowly settling solids which it is desired to retain in the liquid. A convenient arrangement for this purpose particularly designed for concrete construction, comprises a trough-like secondary or classifying compartment 55 having a sloping bottom with its deep end adjacent the periphery of chamber 20 in position to receive settled solids raked and discharged outwardly from the chamber and with its upper end above high water level. Suitable mechanism is provided for raking the settled solids upwardly along the bottom and discharging them in a drained state from the upper end, the mechanism being operable either to rake all settled solids to discharge without throwing them into suspension, or to produce adjacent to the mechanism, a zone of sufficient agitation to throw the lighter solids into suspension so that they may return to the chamber 20. The latter operation is desirable when the apparatus is functioning as a sewage grit chamber, the agitation serving to wash or otherwise free organic solids from the grit to produce a clean, inoffensive grit without further treatment.

While a considerable variety of mechanisms for performing either or both of these solids-washing or classifying functions either intermittently or continuously is known, apparatus of the reciprocating rake type is preferred since the proper construction and operation of apparatus of this type to produce any desired amount of classifying action, or a simple conveying action, is well understood by those skilled in the art. The preferred form illustrated therefore discloses the use of the well known Dorr classifier mechanism shown in the United States Patent No. 1,156,543 issued October 12, 1915.

This arrangement, shown best in Figs. 1 and 2, includes a secondary or classifying compartment 55 communicating with one side or margin of chamber 20 immediately adjacent thereto, having a sloping bottom or deck 56. A chute or incline 57 directs sludge from the collecting device in chamber 20 to the classifying compartment 55, the chute being preferably located adjacent the center of the side of said chamber and extending into the chamber bottom a distance sufficient to permit scoops 36 and 52 to discharge their contents laterally through a restricted marginal exit to be acted upon by the solids washer or classifier. This apparatus, ordinarily referred to as a classifier mechanism, includes a plurality of transverse scraping blades or rakes 58 mounted on longitudinal channels 59 having hanger plates 60 connected by links 61 to the lower arms of bellcranks 62 and 63, the upper arms of which are connected by reach rod 64. The upper bellcrank 62 has a depending arm 65 engaging cam 66 on drive shaft 67, the cam imparting through the bellcranks a suitable periodic movement to the rakes toward and from the bottom 56 of the compartment 55. A crank 68 on shaft 67 carries pitman 69 pivotally connected to drive plates 70 on the channels 59, imparting reciprocating movement to the rakes 58 in line with the bottom 56 of compartment 55.

The lower bellcrank 63 may be pivotally supported at the end of an arm of the lifting bellcrank 71 carried by a transverse rod journaled on the side walls of the compartment 55, the upper arm of bellcrank 71 being connected by a cable 72 to a drum 73 which when rotated will lift bellcrank 63 and the lower end of the raking mechanism as a unit.

The spray pipe 74 may be employed, extending across the compartment 55 and provided with the usual line of perforations positioned to project wash water on the sand or grit at approximately the zone of emergence from the liquid. To compensate for the substantial changes in water level encountered in sewage operations pipe 74 may be rotatable in its journals 75 on the inside walls of the compartment 55, and may be provided with handles 76 by which the spray may be directed at the proper zone according to the height of the water or sewage.

Where a duplex construction is employed as shown in Fig. 1, the two raking units should be offset on the drive shaft 67 by 180 degrees so that gravitational pull of the mechanism on the return stroke of one unit will assist in the advance raking stroke of the other unit, producing more even load on the motor, as set forth in the above mentioned Patent 1,156,543.

An important feature of this invention is the arrangement of the secondary compartment 55 for the backflow to the primary chamber 20 of liquid from said compartment, together with any solids that are in suspension in the liquid due to rejection thereof by the solids washing classifier and the agitative influence thereof. For this purpose it is advantageous to have open communication between the side of the secondary compartment 55 and the settling chamber 20 as is shown in the embodiment illustrated, such communication being broken only by any pillar 77 that may be necessary to support the wall carrying the track 38 or other superstructure.

It has been found in practice that the type of settled solids being handled, together with the amount of draining and agitation required for any particular operation, will determine very accurately the slope of the compartment bottom 56; and as already indicated it is desirable to have the lower end of said bottom in a position determined by the most convenient point of discharge of the settled solids. Under these conditions the compartment bottom or inclined deck 56 may rise above high water level while still adjacent the settling chamber 20; under which conditions it is necessary only to provide lateral open connection between compartment 55 and chamber 20 extending generally at least from near high water level to below low water level (the exact position of this opening being determined by factors hereafter set forth in detail). This arrangement is illustrated in the perspective view in Fig. 10.

Under other conditions the compartment bottom 56 will have its zone between high and low water marks located at some distance from the primary settling chamber 20, either because of the necessary length of compartment 55, because of the contour of the chamber 20 or because of the relative arrangement of chamber and compartment. Under these conditions an arrangement must be provided for the release of liquid, with any solids suspended thereon, from the compartment 55 in a zone where the compartment is not in direct communication with chamber 20. It is of course necessary to include in the arrangement means for permitting the escape of liquid without any substantial amount of grit.

In the construction illustrated, as shown best in Fig. 9, an outlet is provided in one side of the compartment 55 adjacent the portion of bottom 56 between high and low water marks. This outlet should be substantially parallel to the bottom and immediately adjacent thereto; but preferably is slightly above the bottom, providing a ledge 78 for retention of the grit. A discharge deck 79 may be employed, forming the bottom of the outlet, over which the liquid flows into a discharge passage 80 having a sloping bottom 81 and discharging into the settling chamber 20 through outlet 82.

A reciprocating mechanism has particular advantages in cleaning the grit and discharging the separated impurities from the grit independently of the grit discharge. With this type of mechanism the rakes on their advance movement carry up with them a certain amount of liquid in the region where the secondary compartment 55 is not in open communication with the chamber 20. That is, as a rake emerges from the liquid, it carries before it a portion of the liquid to a position superelevated above the liquid level of the main body. This superelevating or creation of waves is progressively carried out as indicated in Figs. 6 to 8 wherein it can be seen that the liquid between adjacent rakes is higher as the upper sloping end of the classifier is approached. It is in this superelevated zone that the agitation or surge therein causes separation and flotation of the organics from the grit. This effect, illustrated in Fig. 6, is utilized in the discharge arrangement shown in Fig. 9, since the liquid thus raised above normal level by the rakes flows laterally over the deck 79 at a suitable velocity, serving to carry off the lighter solids without permitting them to settle again on the grit. That is, the side or lateral outlet from this superelevated zone is communicated through the apertures 88. Such an arrangement produces a lateral or crosswise flow of the liquid across the classifier in this zone and this lateral or sideways flow carries with it the floating or subtantially floating organics. Thus, the organics are promptly removed from the zone of superelevation or of separation from the grit, as soon as their separation takes place.

Where the lateral flow arrangement indicated is employed, it is difficult to prevent the discharge of a substantial amount of grit with the lateral overflow carrying the organic solids back to the settling chamber; and while ledge 78 will serve to retain the grit, it will likewise entrap a certain amount of liquid. It has been found in practice however that with the reciprocating rake type of classifier, the rise of the rakes at the end of the feed stroke will suddenly release the liquid thus entrapped, and such liquid flowing back over the surface of the sand will wash the surface clear of any organic residuum, which is returned to a zone from which it can readily overflow on the next stroke of the rakes.

It has also been found that the location and extent of the discharge 83 is very important where a reciprocating rake classifier mechanism is used. It will be apparent that the discharge 83 must be of sufficient extent to accommodate the substantial fluctuations in liquid level encountered in sewage treatment. Consequently the lower end of the discharge 83 must be sufficiently below water level to permit overflow when the sewage is at its lowest level. It has been found however that where deck 79 is used it is not necessary to locate the upper end of passage 83 at the highest level of liquid raised by the rakes when the sewage is at its maximum height, since the overflow onto deck 79 will flow back along the deck to a substantial distance, this distance being determined by the point at which such backflow meets the upward surge of the liquid due to the next stroke of the rakes. The upper end of discharge 83 therefore may be located this distance below the upper end of deck 79, the latter being of course at the highest point where any lateral overflow can occur.

Where there are extreme changes in sewage level, there may at times be a tendency for the grit to overflow across deck 79, especially near the lower end thereof, when the sewage is at a high level. In order to decrease this tendency means may be employed for restricting the lateral overflow across deck 79. The level of the bottom of the discharge opening 83 may be adjustably raised, as by weir boards 85 set in slots 86, or a plurality of smaller openings may be substituted for the open passage 83, as by a suitable partition 87 (Fig. 8) which may be set in slots 86, extending above high water level and provided with a series of discharge openings 88 parallel to and adjacent the deck 79, the openings being designed and arranged to permit discharge of the liquid while restricting its velocity, particularly toward the lower end of the deck 79. This restriction will be particularly efficacious since under high water conditions the sewage level behind the partition 87 will approach the level on the grit discharge side, reducing further the tendency for high velocity at points substantially below the liquid level.

It will be understood that while deck 79, ledge 78 and the elongated overflow arrangement are all highly advantageous and useful under ordinary conditions, changes in the type of mechanism employed, the arrangement of the compartment and the material operated may readily produce conditions under which these features are not necessary.

This is a divisional patent, divided out from my previously filed patent application Ser. No. 328,155 filed December 14, 1928.

I claim:

1. The process of treating sewage which comprises settling suspended sewage solids in the form of sludge made up of organics and gritty inorganics in a substantially quiescent zone in a flowing stream of sewage, slidably conveying the sludge to and upwardly along a partially submerged inclined deck while in engagement with and supported by said deck for thereby, separating at the zone of emergence of the deck the gritty inorganics from organics, discharging the emerged inorganics as a final product relatively free from organics, and returning the separated submerged organics to the flowing stream of sewage.

2. The process according to claim 1 in which the separation of the sewage organics from the inorganics at the zone of emergence is produced by setting up washing fluid currents on the deck.

3. The process according to claim 1 in which the rejected organics are returned to the sewage stream by a by-pass to prevent their recombining with the sludge being treated on the deck.

4. A process according to claim 1 which is followed by a re-treating of the organics returned to the flowing sewage stream, said re-treating, including re-sedimentation and selective separation for ultimately separating out gritty inorganics that may have passed back to the sewage stream with the returned organics.

5. A process according to claim 1 in which during the upward conveying of the gritty inorganics along the partially submerged inclined deck and after the emergence and separating out of the gritty inorganics from the organics that remain submerged there is an exposing of emerged and emerging gritty inorganics to fluid currents provided for flowing along the deck and over emerged inorganics to wash therefrom, back to the sewage stream, organic material which may be entrained by the emerged inorganics and which organics may have escaped separation from the inorganics at the zone of emergence of the deck whereby a washed gritty inorganic product is effected on the deck, discharging the emerged and washed gritty inorganics, and returning the rejected organics which are still submerged to the flowing stream of sewage.

6. The process of treating sewage which comprises settling sewage solids in the form of sludge made up of organics and gritty inorganics in a substantially quiescent zone in a flowing stream of sewage, collecting and transferring settling sewage sludge to the lower portion of a partially submerged inclined deck, slidably conveying the thus collected and transferred sewage sludge upwardly along the partially submerged inclined deck while in engagement with and supported by the deck for thereby separating at the zone of emergence the gritty inorganics from sewage organics by discharging the emerged inorganics as a final product relatively free from organics, and returning the separated submerged organics to the flowing stream of sewage.

WILLIAM C. WEBER.